United States Patent

[11] 3,608,985

[72] Inventor Walter S. Swanson
 Rockford, Ill.
[21] Appl. No. 25,093
[22] Filed Apr. 2, 1970
[45] Patented Sept. 28, 1971
[73] Assignee Sundstrand Corporation

[54] BEARING PACK AND MOUNTING THEREFOR
 16 Claims, 5 Drawing Figs.
[52] U.S. Cl. .................................................. 308/6 C
[51] Int. Cl. .................................................. F16c 29/06
[50] Field of Search .......................................... 308/6 C,
 72, 207, 212, 213

[56] References Cited
 UNITED STATES PATENTS
3,003,828 10/1961 Stark ............................ 308/6 C
3,245,731 4/1966 Erickson ....................... 308/6 C
3,272,569 9/1966 Mergen ......................... 308/6 C
3,341,262 9/1967 Kalmanek ..................... 308/6 C FOREIGN PATENTS
761,829 1/1934 France ......................... 308/213

Primary Examiner—Martin P. Schwadron
Assistant Examiner—B. L. Grossman
Attorney—Hofgren, Wegner, Allen, Stellman & McCord ABSTRACT: A bearing pack and mounting therefor which minimizes side forces, with the pack having a body member of a cross shape with a central section defining upper and lower lateral guide surfaces for at least two laterally spaced circuits of rolling bearings and with a lateral section extending beyond both sides of the central section intermediate the height thereof to have the lower surfaces define load bearing surfaces, additional members are associated with the body member for retaining the rolling bearings in their travelling circuits and the mounting includes a frame element with a recess for receiving the pack with a backup member aligned with said central section to permit movement of the pack relative to said backup member about plural axes to assist in obtaining uniform loading of the rolling bearings.

PATENTED SEP 28 1971 3,608,985
SHEET 1 OF 2
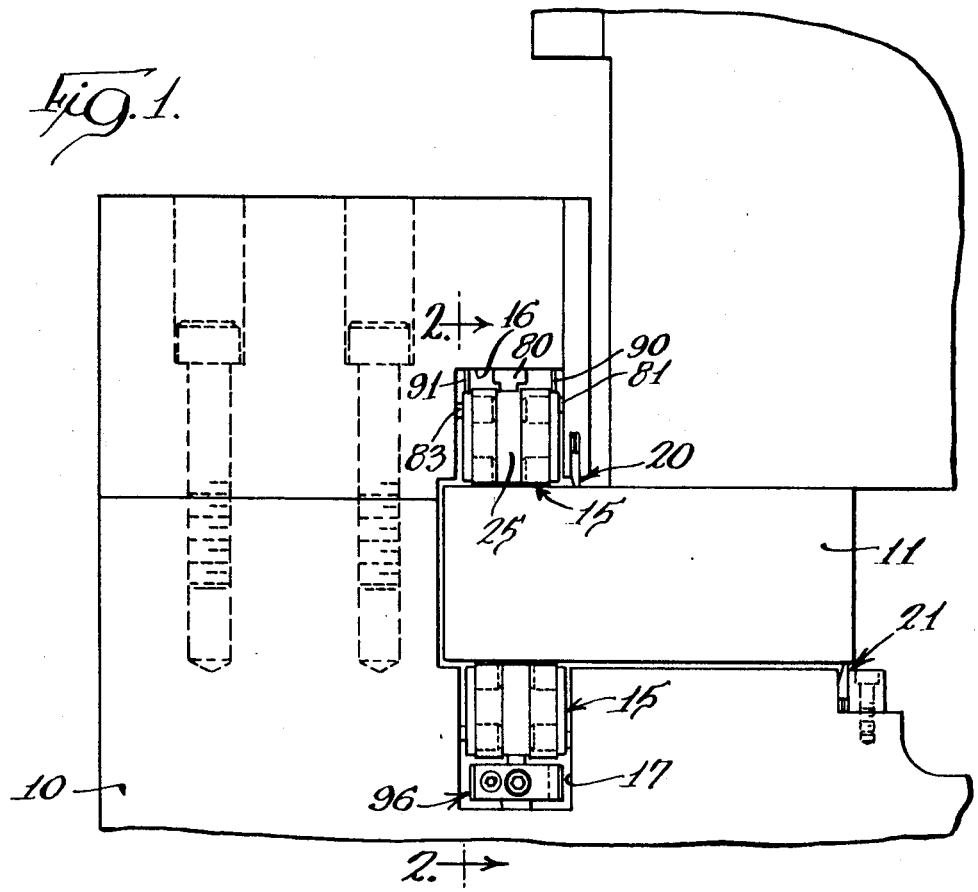
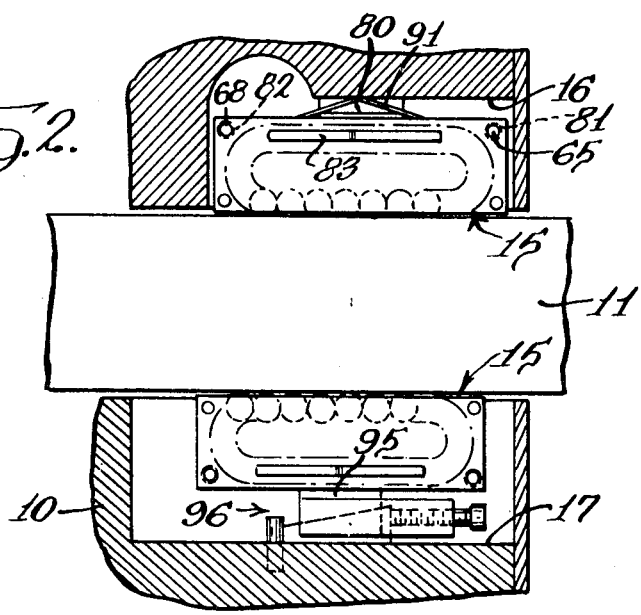
Inventor:
Walter S. Swanson
By Hofgren, Wegner,
Allen, Stellman & McCord
Attys

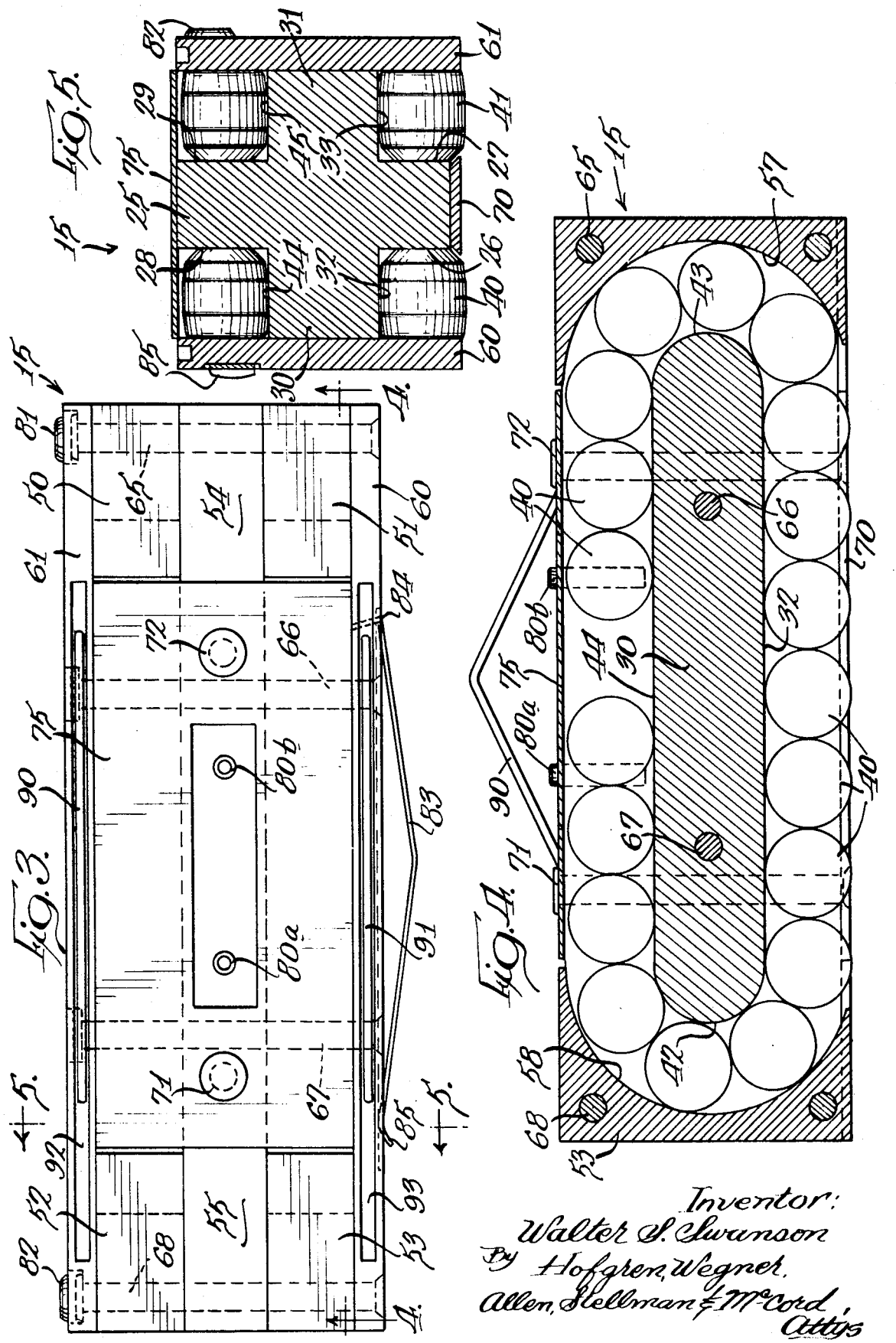

BEARING PACK AND MOUNTING THEREFOR

BACKGROUND OF THE INVENTION

This invention pertains to bearing packs and mountings therefor and, more particularly, to a plural circuit roller bearing pack and mounting which can provide substantial load-carrying capacity with minimal side forces in order to provide extreme accuracy of movement of one part of a machine tool or the like relative to another.

Roller bearing packs have been in existence for many years, with a structure, such as shown in Stark U.S. Pat. No. 3,003,828, being typical of such constructions wherein elongate rollers have a central reduced section for coacting with a guide structure extending centrally along the package. Such roller bearing packs have not performed satisfactorily where extreme accuracy is required because of deflections and similar problems arising from side forces which occur under load in use of the machine tool or the like having the roller bearing packs mounted therein. The bearing pack disclosed in this application substantially overcomes the problems existing in previous roller bearing packs wherein side forces are minimized by obtaining accurate alignment of roller bearings as they enter into a load zone and further by obtaining uniform loading by the mounting of the bearing pack permitting self-alignment. Additionally, the bearing pack disclosed herein is of a construction to provide maximum strength in the smallest possible pack dimensions.

U.S. Pat. No. 3,245,731, owned by the assignee of this application, discloses a plural circuit ball bearing pack which has utility in many applications for providing movement between parts with minimal side forces; however, it is inherent in a ball bearing pack having point contact of each ball that there is not a load capacity comparable to roller bearings having line contact and, therefore, the invention disclosed herein provides a roller bearing pack having increased load capacity as compared to previously known ball bearing packs and having the side forces minimized.

SUMMARY

This application relates to a new and improved bearing pack and mounting therefor whereby side forces which would tend to create deflections in the machine tool components are minimized to provide extreme accuracy in the machine tool.

Another object of this invention is to provide a bearing pack having plural circuits of roller bearings associated with the body member of a cross shape, with a central section having parts thereof defining guide surfaces for the roller bearings and with lateral sections having surfaces, the undersides of which define bearing surfaces for engagement by the roller bearings as they in the load zone defined between the bearing surfaces and an adjacent way of a machine tool or the like and wherein said central section disposed between circuits of roller bearings extends outwardly beyond the axis of rotation thereof to provide a substantial area of contact with roller bearings as they enter into the load zone to square up the rollers and cause their axes to be perpendicular to the path of travel of the bearing pack or of the machine tool part moving relative thereto.

Still another object of the invention is to provide a bearing pack and mounting therefor wherein the bearing pack is fitted into an oversized recess with a back up block at the base of the recess coacting with the central section of the pack to permit pivoting alignment of the pack about an axis extending parallel to the path of roller bearing travel and an axis extending normal thereto and further with the circuits of roller bearings having sufficient width to define an over all tread width which, under loading, can force the package to a position to achieve uniform loading on the roller bearings.

Still another object of the invention is to provide a new and improved roller bearing pack and mounting therefor having a compact, strong construction which is easily assembled from a number of parts and which has a primary body member formed as a cross-shaped member providing guide surfaces and bearing surfaces for the roller bearings.

BRIEF DESCRIPTION OF THE DRAWINGS

FIG. 1 is an elevational view of parts of a machine tool showing bearing packs associated with a machine tool way and carried on another part of the machine tool;

FIG. 2 is a vertical section, taken generally along the line 2—2 in FIG. 1;

FIG. 3 is a plan view of the roller pack, on an enlarged scale;

FIG. 4 is a vertical section, taken generally along line 4—4 in FIG. 3; and

FIG. 5 is a vertical section, taken along the line 5—5 in FIG. 3.

DESCRIPTION OF THE PREFERRED EMBODIMENT

As shown generally in FIGS. 1 and 2, the bearing packs are associated with structure of a machine tool. More particularly, a component 10 of a machine tool is movable relative to a machine tool way 11 with support of the component 10 relative to the way being provided by a pair of the bearing packs, indicated generally at 15, disposed above and beneath the way 11. Each bearing pack 15 is mounted in a suitable recess 16 and 17 formed within the machine tool component, which is of a size larger than the bearing pack as seen in FIGS. 1 and 2. A pair of wipers, indicated generally at 20 and 21, are carried by the component and engage against the way 11 to seal off the bearing packs from extraneous matter, such as metal particles and the like. The structure of these wipers is described specifically in U.S. Pat. No. 3,400,987.

Each of the bearing packs 15 is of the same construction, which is shown specifically in FIGS. 3 to 5. The primary component of the bearing pack is a body member 25 formed as a cross-shaped member, with a central section having upright surfaces 26, 27, 28 and 29, with the lower surfaces 26 and 27 being beneath a lateral section of the body member having parts 30 and 31 extending laterally beyond the upright surfaces 26–29 of the central section. A pair of lower faces 32 and 33 of the lateral section parts 30 and 31 define load-bearing surfaces for two circuits of roller bearings. A first circuit of roller bearing 40 are associated with the upright guide surfaces 26 and 28 of the body member of the pack and with the load-bearing surface 32, while a second series of roller bearings 41 are associated with the upright guide surfaces 27 and 29 of the central section and with the load-bearing surface 33. As seen particularly in FIG. 4, there are a number of roller bearings which, in effect, define a continuous circuit of rolling bearing members with a plurality of the bearings in a load zone defined between the load-bearing surface at the underside of the lateral section of the body member and the adjacent structure of the way 11. The opposite ends of each of the lateral sections are curved, as shown at 42 and 43, for the lateral section 30, to define a curve-connecting path between the load zone and the return zone for the roller bearings above the lateral section part 30 and with the rollers travelling on surfaces 44 and 45 defined by the upper surfaces of the lateral section parts 30 and 31.

The cross-shaped body member 25 provides maximum bending strength in the shortest possible height for the bearing pack.

The body member 25 has a number of parts associated therewith for confining the roller bearings in the pack, including a pair of end blocks 50 and 51 at one end of the pack and a second set of blocks 52 and 53 at the other end which fit at opposite sides of extensions 54 and 55, respectively, of the central section 25 of the body member. Each of these end blocks has a curved interior face coacting with the curved ends 42 and 43 of each of the lateral section parts to guide the roller bearings around from the return upper path to the load zone. As shown for the blocks 51 and 53 in FIG. 4, these curved surfaces are identified at 57 and 58, respectively.

The sides of the pack are closed off by a pair of sideplates 60 and 61 which abut against the outer faces of the end blocks 50–53 and against the outer faces of the lateral section parts 30 and 31, with all of these parts being held in assembled relation by a series of fastening bolts 65, 66, 67, and 68 which extend through the entire width of the ball pack. A bottom retainer strip 70 is secured to the lower face of the central section 25 by a pair of attaching members extending vertically through the body member, as shown at 71 and 72. This retainer member has edge faces inclined upwardly and inwardly, as shown particularly in FIG. 5, for coacting with similar shapes at the ends of the roller bearings to confine the roller bearings within the package while still permitting the roller bearings to extend beneath the level of the side plates 60 and 61 and the retainer member 70 to be under load against the way 11. A top retainer plate 75 spans the lateral section parts of the body member, as shown in FIG. 3, to close off the top of the bearing pack and retain the roller bearings. This top retainer plate is held to the body member 25 also by the fastening members 71 and 72.

The roller pack 15 coacting with the top surface of the way 11, as shown in FIG. 1, has its central section 25 engaged against a back up block 80 at the base of the recess 16 whereby loading on the bearing pack is taken up through the main structural part of the body member of the bearing pack and directly applied against the block 80. The block 80 is loosely mounted in the recess and is held in position during assembly by engagement of roll pins 80a and 80b carried by body member 25 in openings in the block. The bearing pack is mounted within the recess for slight pivotal movement about an axis extending parallel to the path of bearing travel and, in effect, in either clockwise or counterclockwise direction, as viewed in FIG. 1, by a mounting including a pair of locating members 81 and 82 mounted on the outer surface of the sideplate 61 and which engage against the sidewall of the recess of the component 10. The opposite side plate 60 of the bearing pack has a bent spring 83, with one end 84 fixed in the sideplate 60 and the opposite end 85 free to move along the face of the side plate as the spring elongates or contracts. This construction provides a freedom for movement of the bearing pack to move into a desired position of alignment.

It is quite important to obtain uniform loading of all the roller bearings in the load zone and the two circuits of roller bearings 40 and 41 by their spacing and length of rollers provide a relatively wide tread width to provide a maximum moment to make the correction in the alignment of the pack to achieve uniform loading on the roller bearings.

This mounting of the pack also permits pivoting of the pack about a second axis which extends normal to the load-bearing surfaces 32 and 33 of the body member 25 and is a vertical axis for the packs as viewed in FIG. 1.

The bearing pack also has a pair of springs 90 and 91 each having one end fastened to the top parts of the sideplates 60 and 61 with the opposite ends freely sliding in recesses 92 and 93 in the top faces of the respective sideplates, with these springs 90 and 91 engaging the innermost surface of the recess 16 and holding the bearing pack in position during final loading of the package to maintain the pack in general alignment.

The lower bearing pack 15, shown in FIGS. 1 and 2, is mounted against a backup block 95 which is operated by a wedge mechanism, indicated generally at 96, and which is of the same type as disclosed in my prior U.S. Pat. No. 3,245,731 and reference may be made thereto for a more detailed description of this adjusting structure. The primary purpose of this structure is to provide a desired amount of preload on the bearing packs.

With the structure disclosed herein, using rolling elements, such as roller bearings, it is possible to have plural circuits of bearings which provide a relatively wide tread width in a pack having a body member with designed maximum strength and taking the load transmission through a strong rib, defined by the central section extending for substantially the entire height of the bearing pack.

There is a maximum area of guiding of the roller bearings 40 and 41 as they enter into the load zone by forces applied to the inner faces of the roller bearings by the guide surfaces 26 and 27 of the lower part of the central section. The guide surfaces 26 and 27 extend outwardly beyond the axes of rotation of the roller bearings entering the load zone to engage the end face thereof whereby maximum forces are created to square up the roller bearings as they enter into the load zone to have their axis of rotation perpendicular to the path of travel of the bearing pack relative to the associated way of the machine tool. With the self-aligning mount and the structure of the bearing pack for providing this mount, uniform loading is obtained on all of the roller bearings in the load zone with maximum forces available to adjust the bearing pack to obtain the uniform loading, if required.

Without the uniform loading on a roller bearing, the roller bearing will tend to roll at an angle creating side forces. The construction disclosed herein minimizes the possibility of unequal loading of the roller bearings.

I claim:

1. A bearing pack and mounting therefor wherein said pack has a cross-shaped member with a central section defining upper and lower lateral guide surfaces for two laterally spaced circuits of rolling bearings and with a lateral section extending beyond both sides of said central section intermediate the height thereof to have the lower surfaces thereof define load bearing surfaces, means associated with said member for retaining the rolling bearings in said pack, and side mounting including a frame with a recess for receiving the pack with a backup member aligned with said central section, and means mounting said pack in said recess to permit movement of said pack relative to said backup member about a first axis parallel to the path of travel of the rolling bearings and a second axis normal to said load bearing surfaces.

2. In a structure as defined in claim 1, said central section extending between said rolling bearings and outwardly beyond the axis of rotation thereof and of a width to provide substantial separation of said two circuits to define a wide tread width for the pack and resultant effective force under load to rotate said pack about said axes as required to achieve uniform loading on said rolling bearings.

3. A roller bearing pack assembly including a pack body and a self-aligning mounting therefor, said pack body having a cross-shaped member with a central section defining upper and lower lateral guide surfaces for two laterally spaced circuits of roller bearings and with a lateral section extending beyond both sides of said central section intermediate the height thereof to have the lower surfaces thereof define load bearing surfaces, a series of roller bearings in each of said circuits for rolling successively along said load bearing surfaces in a load zone, means associated with said member for retaining the roller bearings in said pack, and said mounting including a frame with a recess for receiving the pack with a backup member aligned with said central section, and means mounting said pack in said recess to permit movement of said pack relative to said backup member about a plurality of axes to achieve uniform loading on said roller bearings.

4. A structure as defined in claim 3 wherein said backup member has a width substantially the same as said central section, locating means on a side of the pack for engaging a wall of the recess and a spring on the opposite side of the pack yieldable to permit movement of said pack about said axes.

5. A structure as defined in claim 4 wherein a pair of springs on said pack extend outwardly therefrom to engage the bottom of said recess and generally align the pack in said recess during assembly and final loading of the pack.

6. A structure as defined in claim 3 wherein the part of said central section defining the lower lateral guide surfaces extends between said roller bearings outwardly beyond the central axis thereof to provide a major area of contact between the ends of roller bearings and said guide surfaces as the roller bearings enter said load zone to square up the roller bearings and cause the axis of rotation of each roller bearing to be perpendicular to the path of travel of the roller bearing.

7. A structure as defined in claim 6 wherein said central section part has a width to provide substantial separation between said circuits to provide a tread width sufficient to provide a moment which will rotate said pack relative to the backup member upon the occurrence of unequal forces on said roller bearings to restore uniform loading on said roller bearings.

8. A bearing pack having a cross-shaped body member with a central upright section defining upper and lower lateral guide surfaces for at least two laterally spaced circuits of rolling elements, and a lateral section extending beyond both sides of said central section intermediate the height thereof to have the lower surfaces thereof define load bearing surfaces for elements in a load zone between said bearing surfaces and an adjacent machine tool way or the like, said central section extending outwardly beyond the center of said bearings in the load zone, and means attached to said body member and positioned at the sides, ends, top and bottom of the pack to coact with said body member for retaining elements in the pack.

9. A bearing pack as defined in claim 8 wherein said retaining means comprises a pair of sideplates abutting the ends of the lateral section of said body member, end members, a bottom retainer strip abutting the bottom of said central upright section and spaced from said side plates to permit protrusion of said elements, and a top retainer plate.

10. A roller bearing pack having a body member with a central upright section and a lateral section between the top and bottom of the central section and extending laterally beyond the central section, the lower surfaces of said lateral section defining bearing surfaces for bearings in a load zone between said bearing surfaces and an adjacent machine tool way or the like, the upright exposed sides of the central section defining guide surfaces for roller bearings travelling in two laterally spaced circuits, a plurality of roller bearings disposed in each of said circuits with a plurality of roller bearings in each circuit being in the load zone, and means attached to the body member for confining said roller bearings to their circulating paths.

11. A roller bearing pack as defined in claim 10 wherein the bottom of said central section extends outwardly beyond the central axis of the roller bearings in the load zone to have maximum contact of the guide surfaces thereof with the ends of the roller bearings to square up the roller bearings as they enter said load zone.

12. A roller bearing pack as defined in claim 11 wherein said confining means includes a pair of sideplates abutting the sides of the lateral section and spaced from the guide surfaces of the central section.

13. A roller bearing pack as defined in claim 12 wherein said confining means further includes end blocks fitted between said sideplates and attached thereto with a curved surface coacting with curved ends of said lateral sections.

14. A roller bearing pack as defined in claim 12 wherein said confining means includes a retainer plate fastened to the lower surface of said central section and having lateral faces inclined similarly to a portion of the roller bearings.

15. A roller bearing pack as defined in claim 14 including, a pair of spaced-apart locating surfaces on one of said sideplates, and a spring extending outwardly from the other sideplate.

16. A roller bearing pack as defined in claim 15 including a pair of springs associated one with each of said sideplates and extending outwardly from the top thereof.